US008941834B2

(12) United States Patent  (10) Patent No.: US 8,941,834 B2
Meijer et al.  (45) Date of Patent: Jan. 27, 2015

(54) INTERFERENCE FILTERS WITH HIGH TRANSMISSION AND LARGE REJECTION RANGE FOR MINI-SPECTROMETER

(75) Inventors: Eduard Johannes Meijer, Eindhoven (NL); Eugene Timmering, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 212 days.

(21) Appl. No.: 13/378,382

(22) PCT Filed: Jun. 11, 2010

(86) PCT No.: PCT/IB2010/052602
§ 371 (c)(1),
(2), (4) Date: Dec. 15, 2011

(87) PCT Pub. No.: WO2010/146510
PCT Pub. Date: Dec. 23, 2010

(65) Prior Publication Data
US 2012/0092666 A1    Apr. 19, 2012

(30) Foreign Application Priority Data
Jun. 17, 2009 (EP) .................................... 09162972

(51) Int. Cl.
*G01N 21/25* (2006.01)
*G02B 5/28* (2006.01)
(Continued)

(52) U.S. Cl.
CPC . *G02B 5/288* (2013.01); *G01J 3/02* (2013.01); *G01J 3/0256* (2013.01); *G01J 3/51* (2013.01); *G01J 3/513* (2013.01); *G02B 5/284* (2013.01)

USPC .......................................................... 356/419

(58) Field of Classification Search
USPC .................. 356/326, 328, 334, 419; 359/589; 29/428
See application file for complete search history.

(56) References Cited

U.S. PATENT DOCUMENTS

| 2,590,906 A | 4/1952 | Tripp |
| 5,173,800 A | 12/1992 | King |

(Continued)

FOREIGN PATENT DOCUMENTS

| JP | 58144804 A | 8/1983 |
| JP | 2002277326 A | 9/2002 |

OTHER PUBLICATIONS

Young et al., "Control of resonant wavelength from organic light-emitting materials by use of a Fabry-Perot microcavity structure", pp. 3312-3318, vol. 41, No. 16, Jun. 2002.

*Primary Examiner* — Tarifur Chowdhury
*Assistant Examiner* — Abdullahi Nur
(74) *Attorney, Agent, or Firm* — Meenakshy Chakravorty

(57) ABSTRACT

The invention relates to an interference filter (100) for receiving an incident light (135) and selecting a light component of the incident light to be transmitted (115). The interference filter (100) includes a metal mirror (110), a dielectric mirror (130), and a spacer (120) placed between the metal mirror (110) and the dielectric mirror (130). The metal mirror (110) and the dielectric mirror (130) are configured to enable optical interference in the spacer (120) to select the light component of the incident light to be transmitted (115). Using one metal mirror and one dielectric mirror allows achieving a spectral response with high finesse and large rejection band while reducing the total number of layers in the filter and reducing the number of additional filters necessary for removing transmitted side bands, relative to prior art approaches.

20 Claims, 5 Drawing Sheets

(51) Int. Cl.
  *G01J 3/02* (2006.01)
  *G01J 3/51* (2006.01)

(56) References Cited

U.S. PATENT DOCUMENTS

| | | |
|---|---|---|
| 5,272,518 A | 12/1993 | Vincent |
| 5,381,232 A | 1/1995 | Van Wijk |
| 5,391,232 A | 2/1995 | Kanai et al. |
| 6,522,469 B1 * | 2/2003 | Fuqua et al. .................. 359/578 |
| 6,859,483 B1 * | 2/2005 | Boucher et al. ................. 372/92 |
| 6,870,868 B2 * | 3/2005 | Kahen et al. .................... 372/39 |
| 2004/0142484 A1 * | 7/2004 | Berlin et al. ................. 436/171 |
| 2006/0055308 A1 | 3/2006 | Lairson et al. |
| 2008/0094631 A1 | 4/2008 | Jung et al. |

\* cited by examiner

INTERFERENCE FILTERS WITH HIGH TRANSMISSION AND LARGE REJECTION RANGE FOR MINI-SPECTROMETER

FIELD OF THE INVENTION

The invention relates to optical filters and, more specifically, to interference filters and mini-spectrometers comprising such interference filters.

BACKGROUND OF THE INVENTION

In recent years, illumination systems that include multiple light sources are being developed. An example of such an illumination system is an arrangement of several sets of light sources in a structure (for example, a room, a lobby or a vehicle) that allows consumers to obtain a desired ambiance for the structure. The light sources, such as e.g. light emitting diodes (LED's), are driven electrically to produce light of a particular spectrum. Spectra of the individual light sources may differ from one light source to another, change over time, and depend on the drive level. Thus, in order to realize proper control of the illumination system, an accurate measurement of the light spectrum is necessary.

One approach to measuring the light spectrum of an illumination system is to use a spectrometer that includes an array of narrow-band color filters coupled to photodetectors. Every photodetector measures a small part of the spectrum filtered via the corresponding color filter. With the individual results from multiple photodetectors the entire spectrum can be reconstructed.

One type of a narrow-band color filter is an interference filter that includes two dielectric mirrors separated by a spacer layer. Although such a filter provides relatively high transmission at the desired wavelength and a very narrow response, this type of filter possesses an inherent drawback in that there are other wavelengths beyond the rejection band of the filter which are transmitted through the filter in addition to the desired wavelength (i.e., sidebands). In order to get rid of the sidebands, the filter must be combined with high pass and low pass filters. This adds to the complexity and cost of the devices including such filters. In addition, sidebands result in a situation where, in order to select the light component of the incident light to be transmitted, not only the thickness of the spacer layer needs to be varied, but also the thickness of the dielectric mirrors. This is problematic for spectrometer applications. For these applications it is desired to obtain as many different filter responses as are necessary in the visible part of the spectrum with as little variation in the layers as possible.

Another type of a narrow-band color filter is an interference filter that includes two metal mirrors separated by a spacer layer. Such a filter typically does not suffer from the sideband problems mentioned for the dielectric mirrors. Moreover, increasing the thickness of the metal mirrors allows narrowing the response. The transmission for such a filter is not nearly as high as one with dielectric mirrors, however because increasing the thickness of the metal mirrors also results in decreased transmission at the desired wavelength. In addition, silver, which is the most optimal metal from an optical point of view, has poor stability in ambient conditions. Therefore, additional packaging is typically required to protect silver, which, again, adds to the complexity and cost of the devices including such mirrors.

As the foregoing illustrates, there exists a need in the art for providing, an interference filter having high transmission at the desired wavelength, narrow response, large rejection band, and good stability in ambient conditions.

SUMMARY OF THE INVENTION

It is an object of the invention to provide an improved and cost-effective interference filter and a mini-spectrometer incorporating such an interference filter.

One object of the invention is achieved by an interference filter that includes a metal mirror, a dielectric mirror, and a spacer placed between the metal mirror and the dielectric mirror. The metal mirror and the dielectric mirror are configured to enable optical interference in the spacer to select a light component of an incident light to be transmitted. The metal mirror may comprise silver, while the dielectric mirror may comprise a quarter-wavelength stack of at least one repeating unit of a low-refractive index material disposed over a high-refractive index material. The spacer may comprise a cavity filled with gas, preferably inert gas, or a non-gaseous material that is optically transparent for the light component of the incident light to be transmitted.

Combining one dielectric mirror and one metal mirror allows having higher transmission values of the selected light component and tuning the selectivity of the interference filter within a wider range of wavelengths by only varying the thickness of the spacer while keeping the thicknesses of the mirrors constant, relative to metal-mirror based filters and dielectric-mirror based filters described in the background section.

A mini-spectrometer that includes such an interference filter is also disclosed. The mini-spectrometer further includes a photo-detector configured for detecting the light component transmitted by the interference filter.

Further, a method for fabricating at least a first interference filter for receiving an incident light and selecting a first light component of the incident light to be transmitted is provided. The method includes the steps of providing a first metal mirror, providing a spacer over the first metal mirror, and providing a dielectric mirror over the spacer. The first metal mirror, a part of the spacer provided substantially over the first metal mirror, and a part of the dielectric mirror provided substantially over the part of the spacer provided substantially over the first metal mirror form a first interference filter for receiving the incident light and selecting the first light component of the incident light to be transmitted.

The gist of the invention resides in providing a hybrid optical interference filter by including a metal mirror and a dielectric mirror separated by a spacer. For fixed thicknesses of the metal mirror and the dielectric mirror, desired spectral response of the filter may be obtained by selecting or controlling the spacer thickness. Using one metal mirror and one dielectric mirror in this manner allows achieving a spectral response with high finesse and large rejection band while reducing the total number of layers in the filter and reducing the number of additional filters necessary for removing transmitted side bands, relative to prior art approaches. Furthermore, according to one embodiment of the invention, providing the metal mirror as a bottom mirror and covering the metal mirror with the spacer and the dielectric mirror allows protecting the metal mirror from degradation and facilitates dicing or sawing of the structure while retaining the protection of the metal mirror.

As used herein, the term "light" refers to optical radiation both within and outside of the visible spectrum.

Embodiments of claims 2 and 7 advantageously allow selecting the light component of the incident light to be transmitted by varying either a thickness or a composition of the spacer. For instance, by varying the composition to control the refractive index, the effective optical thickness is changed. Thus, this allows to tune the selection of the light component of the incident light to be transmitted.

Embodiments of claims 10 and 15 specify that a thickness of the spacer may be varied to select the light component to be transmitted while keeping the thicknesses of the metal mirror and the dielectric mirror constant. Embodiments of claims 3 and 8 advantageously disclose a range for varying the thickness of the spacer and a range related to the light component of the incident light to be transmitted while keeping the thicknesses of the metal mirror and the dielectric mirror constant.

Embodiments of claims 4 and 14 enable protection of the metal mirror from ambient conditions.

Embodiment of claim 5 allows incorporation of a spacer layer under the metal mirror.

Embodiment of claim 9 allows incorporating in a mini-spectrometer more than one set of an interference filter and a photo-detector for detecting light components that are respectively different in wavelengths to be transmitted.

Embodiment of claim 12 advantageously allows fabricating two interference filters. In a particular embodiment, at least one of the spacer and the dielectric mirror may be disposed over both filters at the same time.

Embodiment of claim 13 advantageously discloses that at least one interference filter may be fabricated on a substrate that includes a photo-detector.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
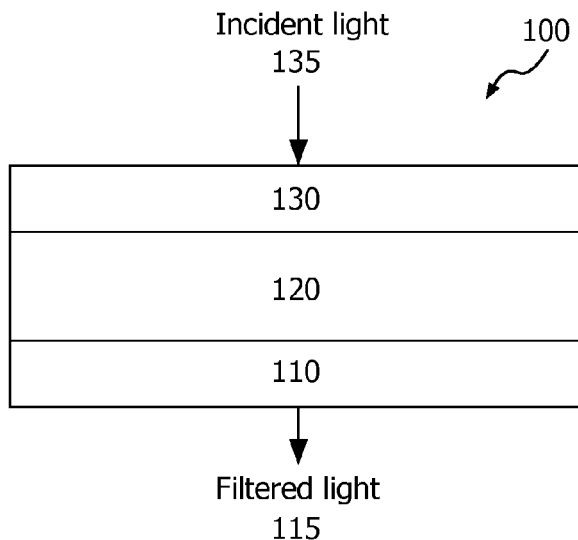
FIG. 1 is a schematic illustration of a hybrid filter according to an embodiment of the invention.

FIG. 1 is a schematic illustration of a hybrid metal-dielectric color filter 100 according to an embodiment of the invention. As shown, the hybrid filter 100 includes a metal mirror 110 and a dielectric mirror 130. A spacer 120 is sandwiched between the metal mirror 110 and the dielectric mirror 130.

The metal mirror 110 may comprise a thin layer of metal such as e.g. silver (Ag) or aluminum (Al). The dielectric mirror 130 may comprise a dielectric quarter-wavelength reflector stack of one or more repeating units of a low-refractive index material disposed over a high-refractive index material. The metal mirror 110 and the dielectric mirror 130 are semi-reflective for light with the wavelengths of interest for a particular application.

The spacer 120 may comprise any material, provided that it is substantially transparent for light with the wavelengths of interest. In the visible wavelength range the spacer 120 may comprise e.g. $SiO_2$, $TiO_2$, SiN, $Ta_2O_5$, or ZnS. The spacer 120 may also comprise a cavity filled with liquid, air or gas, preferably inert gas.

In the following discussions, it is assumed that the metal mirror 110 is disposed on a substrate, the spacer 120 comprises a solid material disposed over the metal mirror 110 and the dielectric mirror 130 is disposed over the spacer 120. In other embodiments, however, the dielectric mirror 130 may be disposed on a substrate with the spacer 120 (either gas or solid) being placed between the dielectric mirror 130 and the metal mirror 110 being disposed as a top mirror covering the dielectric mirror 130 and the spacer 120.

In operation, light of various wavelengths may be incident on the hybrid filter 100, specifically, on the dielectric mirror 130 of the hybrid filter 100, shown in FIG. 1 as "incident light 135". Due to the optical interference created in the spacer 120 by two semi-reflective surfaces (the metal mirror 110 and the dielectric mirror 130), only a light component of a certain wavelength range will pass through the hybrid filter 100 (i.e., will exit from the metal mirror 110, shown in FIG. 1 as "filtered light 115"). This specific wavelength range is referred to herein as a "transmission band" and the wavelength of light in the transmission band that has the largest transmission is referred to herein as a "central wavelength" of the spectral response of the filter. Wavelengths of light that does not pass through the hybrid filter 100 are referred to herein as belonging to a "rejection band."

The metal mirror 110 is typically disposed over a substrate (not shown in FIG. 1) and/or a photodetector or other device (not shown in FIG. 1) configured to receive the filtered light 115. In such embodiments, the metal mirror 110 may be completely covered by the spacer 120, i.e. be covered by the spacer 120 on all sides except the side facing the substrate, the photodetector or other device over which the metal mirror 110 is disposed. Such an arrangement may prevent the metal mirror 110 from degradation.

The hybrid filter 100 is said to provide a particular spectral response. The spectral response may be described in terms e.g. of specific transmission and rejection bands, a specific central wavelength in the response, a specific transmission value of light of the central wavelength, and/or a specific full-width half maximum (FWHM) of the filtered light component. For a particular incident light, the spectral response of the hybrid filter depends, among other things, on compositions and thicknesses of the metal mirror 110, the spacer 120, and the dielectric mirror 130. In each of the following discussions, it is assumed that the compositions of the metal mirror 110, the spacer 120, and the dielectric mirror 130 are selected and remain constant.

As illustrated in FIGS. 2A, 2B, 3A, and 3B, for fixed thicknesses of the metal mirror 110 and the dielectric mirror 130, desired spectral response of the hybrid filter 100 may be obtained by selecting an appropriate thickness of the spacer 120.

Figure 2A:
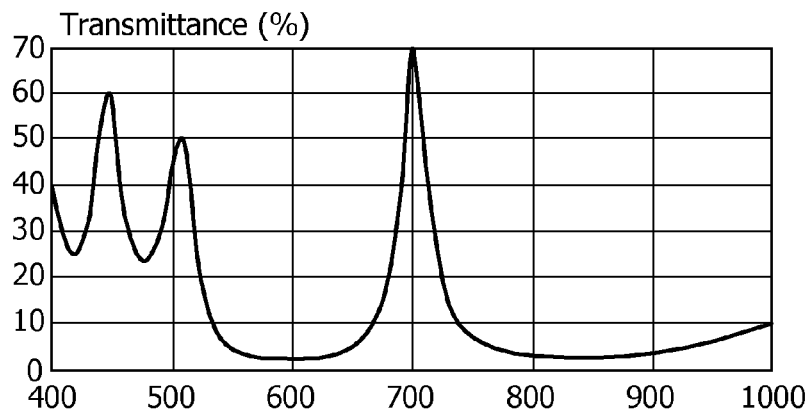
FIG. 2A illustrates spectral response of a 7-layer hybrid filter in a long wavelength range.

FIG. 2A illustrates a spectral response of a 7-layer hybrid filter in a long wavelength range when thickness of the spacer 120 is 162 nanometers (nm). According to one embodiment of the invention, the 7-layer hybrid filter may include seven layers as follows. The metal mirror 110 may comprise a (bottom) layer of 30 nm-thick Ag. The spacer 120 may comprise a layer of SiN. The dielectric mirror 130 may comprise five quarter-wavelength-thick layers of $TiO_2$ (the high-refractive index material) and $SiO_2$ (the low-refractive index material) for a reference wavelength of 650 nm. Persons skilled in the art will recognize that the term "reference wavelength" refers to the wavelength around which the reflectivity of the dielectric mirror 130 is centered.

The x-axis of FIG. 2A is used to indicate wavelength, measured in nm. The y-axis of FIG. 2A is used to indicate transmittance, proportional to the ratio between an intensity of the filtered light 115 and an intensity the incident light 135, expressed as a percentage. As shown in FIG. 2A, the spectral response is characterized by relatively large rejection band, high transmission at the central wavelength (of about 700 nm), and small FWHM (i.e. a high finesse).

Figure 2B:
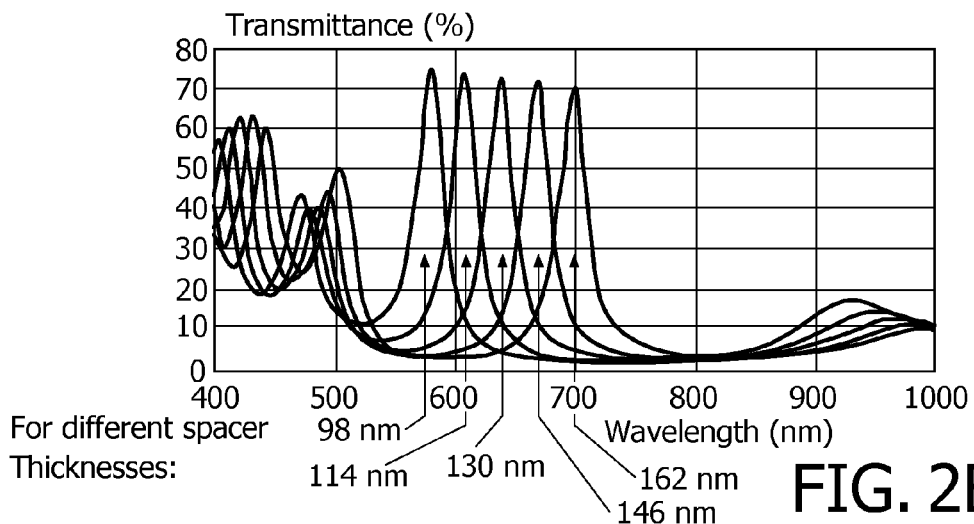
FIG. 2B illustrates spectral responses of 7-layer hybrid filters with varying spacer thicknesses in a long wavelength range.

FIG. 2B illustrates spectral responses of the 7-layer hybrid filters as described in FIG. 2A, but with the thickness of the spacer 120 varying between 98 nm and 162 nm. As shown in FIG. 2B, changing the thickness of the spacer 120 shifts the central wavelength of the response. For wavelengths between 550 nm and 900 nm all of the illustrated responses have high transmission at their central wavelengths and small FWHM. Additional transmissions at wavelengths below 550 nm may be filtered out by including a single high-pass glass filter or a high-pass dielectric filter. Such additional transmissions outside of the transmission band are referred to herein as "transmission side lobes."

Figure 3A:
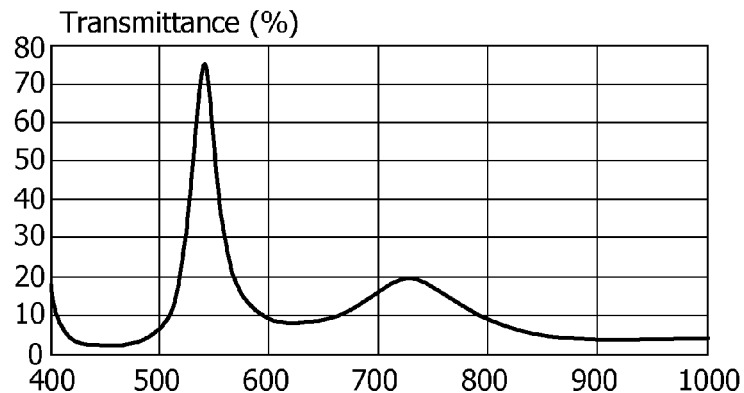
FIG. 3A illustrates spectral response of a 7-layer hybrid filter in a short wavelength range.

According to another embodiment of the invention, the hybrid filter 100 may include 7-layers as follows. The metal mirror 110 may comprise a (bottom) layer of 30 nm-thick Ag. The spacer 120 may comprise a layer of SiN. The dielectric mirror 130 may comprise five quarter-wavelength-thick layers of $TiO_2$ (the high-refractive index material) and $SiO_2$ (the low-refractive index material) for a reference wavelength of 460 nm. FIG. 3A illustrates a spectral response of such a 7-layer hybrid filter in a short wavelength range when thickness of the spacer 120 is 133 nm.

Figure 3B:
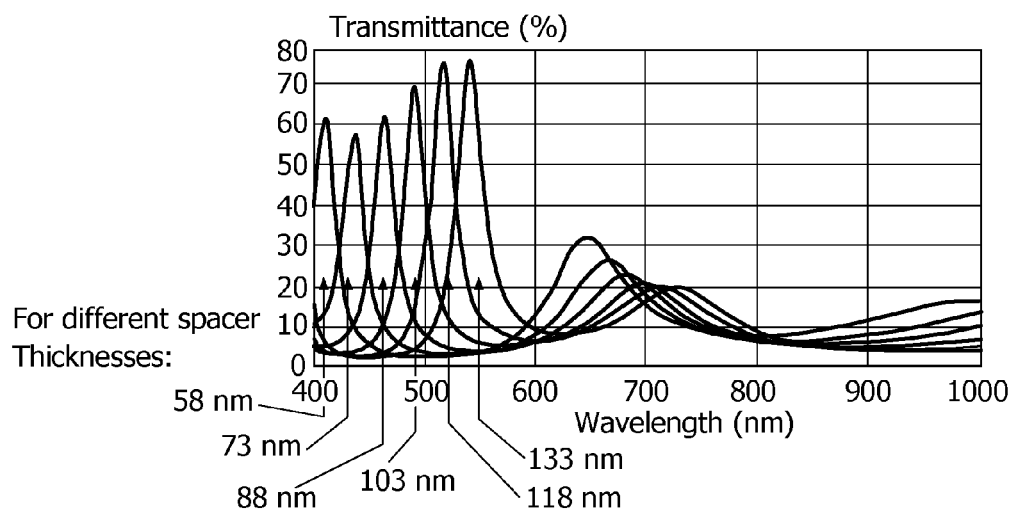
FIG. 3B illustrates spectral responses of 7-layer hybrid filters with varying spacer thicknesses in a short wavelength range.

As shown in FIG. 3A, the spectral response is, again, characterized by relatively large rejection band, high transmission at the central wavelength (of about 540 nm), and high finesse. FIG. 3B illustrates spectral responses of the 7-layer hybrid filters as described in FIG. 3A, but with the thickness of the spacer 120 varying between 58 nm and 133 nm. As shown in FIG. 3B, changing the thickness of the spacer 120 shifts the central wavelength of the spectral response. For wavelengths between 400 nm and 550 nm all of the responses illustrated in FIG. 3B have high transmission at the central wavelengths and small FWHM. Transmission side lobes at wavelengths above about 550 nm may be filtered out by including one or more additional filters.

As illustrated above, the hybrid filter 100 having the metal mirror 110 as a "bottom" mirror and the dielectric mirror 130 as a "top" mirror allows achieving a large rejection band and high finesse of the filtered light while reducing the number of additional filters necessary to remove the transmission side lobes relative to the prior art approaches.

Furthermore, the hybrid filter 100 allows shifting the central wavelength of the spectral response by only changing the thickness of the spacer 120 (i.e., without changing the thicknesses of the metal mirror 110 and the dielectric mirror 130). This would not be possible with all-dielectric filters described in the background section. Persons skilled in the art would recognize that in order to shift the central wavelength of an all-dielectric filter while preserving a large rejection band, the thicknesses of the dielectric mirrors have to be changed as well. The feature of being able to shift the central wavelength by only changing the thickness of the spacer 120 simplifies production of devices that include two or more filters with different spectral responses (e.g., spectrometers, light sensors), as described below, because otherwise for each filter a new stack would need to be deposited, resulting in more deposition runs and more lithography.

Figure 4A:
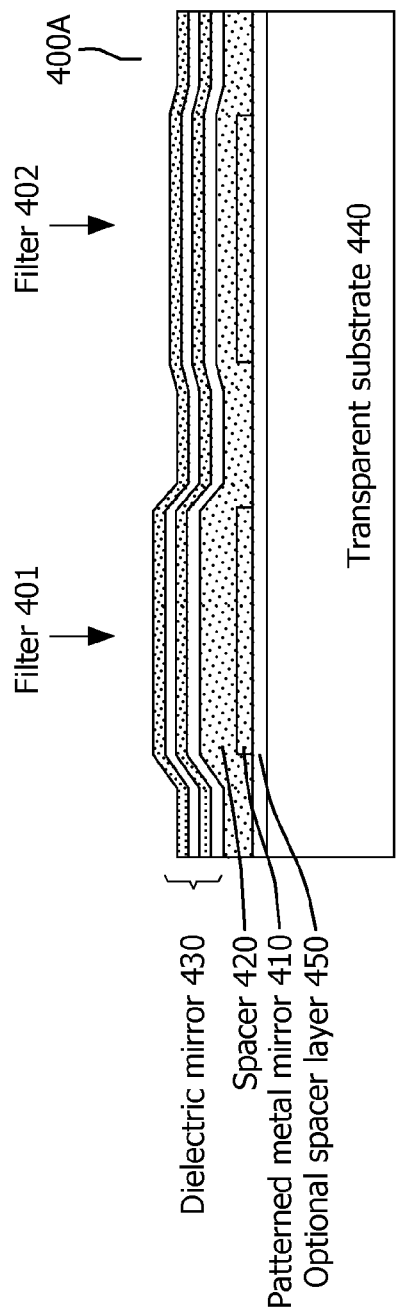
FIG. 4A is a schematic illustration of a device having two hybrid filters according to one embodiment of the invention.

FIG. 4A is a schematic illustration of a device 400A having a hybrid filter 401 and a hybrid filter 402 according to one embodiment of the invention. As shown, the hybrid filters 401 and 402 are disposed on a transparent substrate 440 such as e.g. glass or sapphire.

Optionally, a thin-film spacer layer 450 may be disposed between the hybrid filters 401 and 402 and the substrate 440. The spacer layer 450 may comprise any material, provided that it is substantially transparent in the wavelengths of interest. In the visible wavelength range the spacer layer 450 may comprise e.g. $SiO_2$, $TiO_2$, SiN, $Ta_2O_5$, or ZnS. Thickness of the spacer layer 450 may be selected to be in the sub-wavelength range of the wavelengths of interest to avoid influencing responses of the hybrid filters 401 and 402. For example, in the visible wavelength range, the thickness of the spacer layer 450 may be between 5 and 50 nm. Thickness of the spacer layer 450 may also be selected such that the spacer layer 450 yields a flat transmittance over the wavelength range of interest. In this case, for the visible wavelength range, the thickness of the spacer layer 450 could be approximately 50 nm.

As further shown in FIG. 4A, a structured metal mirror 410 may be used as the "bottom" mirror for the hybrid filters 401 and 402. Such a structured metal mirror 410 is analogous to the metal mirror 110 described in FIG. 1, and may be deposited e.g. through a shadow mask. Alternatively, a layer of metal may be sputtered and subsequently may be patterned through optical lithography to produce the structured metal mirror 410. Thus, while a single integrated metal mirror is possible, advantageously the metal mirror is patterned. As a continuous layer of spacer 420 is deposited over the metal mirror 410—analogous to the spacer 120 described in FIG. 1—patterning the metal mirror results in a full encapsulation of the mirror parts by the spacer. This increases the protection against degradation, e.g. oxidation under the influence of exposure to air/water comprising chlorides and sulfides. Moreover, applying a patterned metal mirror allows for dicing the product without having to cut through the metal layer (which would expose it to the ambient again). During deposition or after deposition of the spacer 420, different layer thicknesses may be defined for the spacer 420 of the hybrid filters 401 and 402. This may be accomplished e.g. by etching different areas for a different period of time so as to form a stair-stepped structure. Alternatively, a continuously graded thickness of the spacer can be obtained so as to form a wedge type structure. As a last step of fabrication, a dielectric mirror 430 is deposited over the spacer 420. The dielectric mirror 430 is analogous to the dielectric mirror 130 described in FIG. 1.

The spacer 420 and/or the dielectric mirror 430 may completely cover the metal mirror 410, including the sides of the metal mirror 410, thus providing automatic packaging for the metal mirror 410. With such an approach, metals that are preferable for the use in hybrid filters due to their optical properties, but have poor stability in ambient conditions may be used in the hybrid filters 401 and 402. Furthermore, complete coverage of the metal mirror 410 also allows the dicing or sawing of the device 400A (e.g. to separate the hybrid filters 401 and 402) while retaining the protection of the metal mirror 410.

Since the spacer 420 has different thicknesses in the hybrid filters 401 and 402, these filters provide different spectral response (i.e., these filters transmit different light components). More specifically, the central wavelength of the spectral response of the hybrid filter 401 is different from that of the hybrid filter 402. At the same time, the composition and thickness of the metal mirror 410 and the dielectric mirror 430 may be the same for both hybrid filters 401 and 402. Using one dielectric and one metal mirror allows having higher transmission values for the selected light component and selecting a spectral response (i.e., the component of the light to be transmitted by the filter) via selecting only the thickness of the spacer 420 (i.e., while keeping compositions and thicknesses of the mirrors constant) within a broader range of wavelengths than is possible with all dielectric-mirror based interference filters and also with higher transmission than all metal-mirror based interference filters described in the background section.

The range for selecting the spectral response by only varying the thickness of the spacer 420 depends on the spectral position of the sideband at the low wavelength side of the filter. For example, for an interference filter including a 30 nm-thick silver mirror, a SiN spacer, and a dielectric mirror including 5 layers of alternating $SiO_2$ and $TiO_2$ layers, thickness of the spacer 420 may be varied from 100 nm to 160 nm in order to select the central wavelength of the spectral response between 560 and 700 nm, while keeping the compositions and thicknesses of the dielectric mirror and the metal mirror constant. Thus, a thickness of the spacer 420 may be defined within a range of 60 nm to select the light component of the incident light to be transmitted having a central wavelength within a range of 140 nm, while a thickness of the metal mirror 410 and a thickness of the dielectric mirror 430 remain constant. In such a case, the device 400 may be fabricated to include the metal mirror 410 comprising 30 nm-thick silver layer, the dielectric mirror 430 comprising 5 layers of alternating $SiO_2$ and $TiO_2$, the spacer 420 comprising a layer of SiN having a thickness of, for example, 100 nm in a first part of the spacer 420 forming the interference filter 401 and having a thickness of, for example, 160 nm in a second part of the spacer 420 forming the interference filter 402. With this configuration, the central wavelength of the light component transmitted by the interference filter 401 would be 560 nm, while the central wavelength of the light component transmitted by the interference filter 402 would be 700 nm. Therefore, the device 400 may be advantageously used in e.g. mini-spectrometer applications, where it is desirable to obtain several different filter responses in the visible part of the spectrum with as little effort and variation in layers as possible. Fabricating the device 400 as described above allows reducing the cost and complexity of the system where the device 400 may be included in.

Figure 4B:
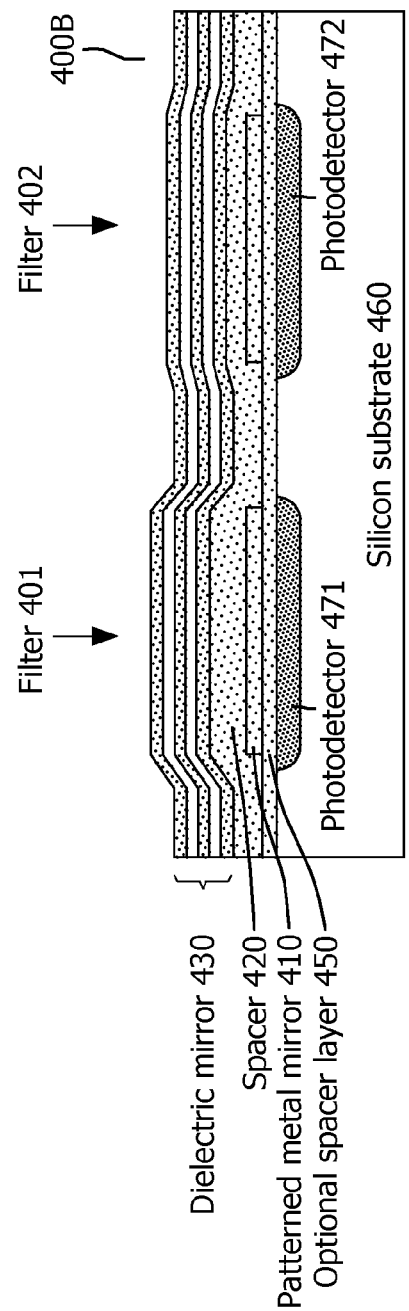
FIG. 4B is a schematic illustration of a device having two hybrid filters according to another embodiment of the invention.

FIG. 4B is a schematic illustration of a device 400B having two hybrid filters 401 and 402 according to another embodiment of the invention. The device 400B differs from the device 400A only in that the metal mirror 410 is disposed on a silicon substrate 460 instead of the transparent substrate 440. Spacer layer 450 could in this case serve the purpose of electrically insulating the metal electrode from the photo-detectors in the silicon substrate. As shown in FIG. 4B, the silicon substrate 460 may include photo-detectors 471 and 472. The hybrid filters 401 and 402 are disposed over the photo-detectors 471 and 472 so that the photo-detector 471 is configured to receive light filtered by the hybrid filter 401 and the photo-detector 472 is configured to receive light filtered by the hybrid filter 402. As described above, each of the hybrid filters 401 and 402 select for transmission only the light of a certain wavelength range, which results in a precise measurement of the intensity of light in two rather narrow wavelength ranges by means of the corresponding photo-detectors 471 and 472. The electric signals resulting from the detection of the light transmitted by the hybrid filters 401 and 402 may be processed by means of control electronics. These may also be disposed in the silicon substrate 460 (not shown in FIG. 4B).

Figure 5:
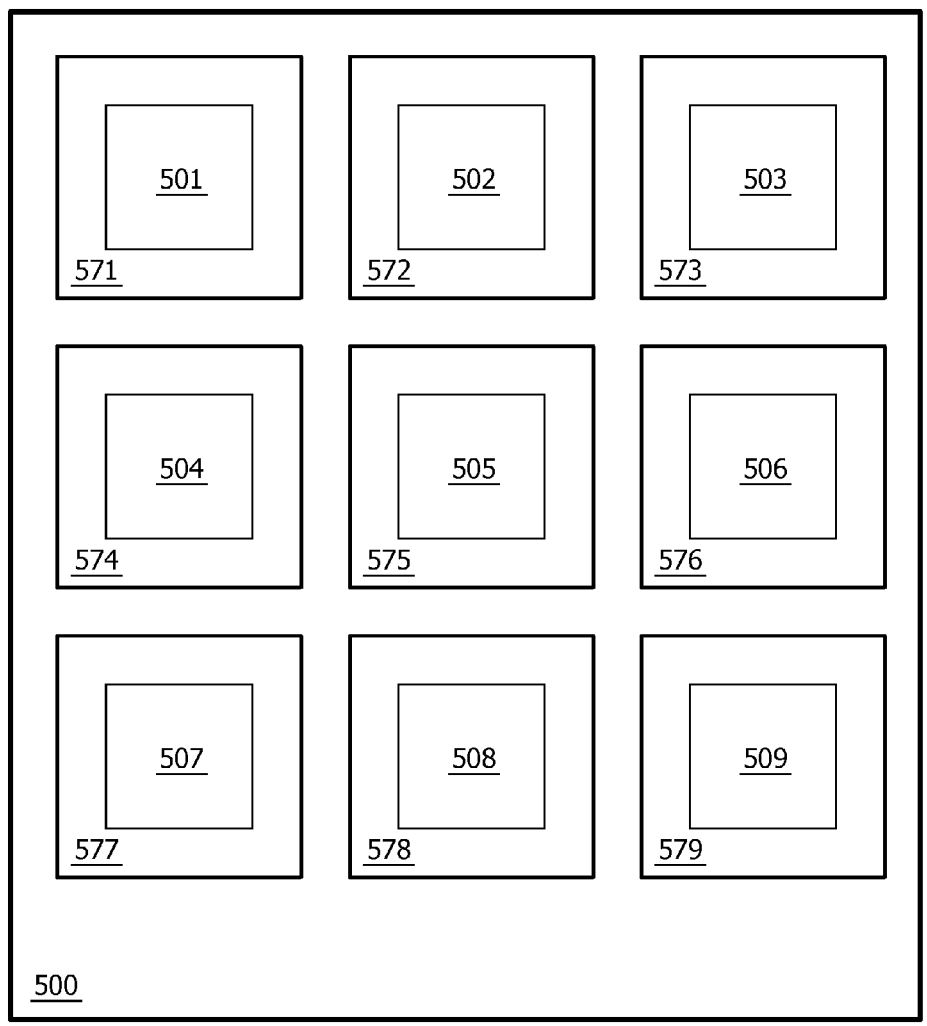
FIG. 5 is a schematic illustration of a mini-spectrometer according to one embodiment of the invention.

FIG. 5 is a schematic illustration of a mini-spectrometer 500 according to one embodiment of the invention. As shown, the mini-spectrometer 500 includes at least hybrid filters 501 and 502 and, optionally, hybrid filters 503-509. The hybrid filters 501-509 may be deposited and structured similar to the hybrid filters 401 and 402 described in FIGS. 4A and 4B. Thickness of the spacer 420 varies in the hybrid filters 501-509, resulting in various spectral responses from each of the hybrid filters 501-509. In other words, from the light of multiple wavelengths incident on the mini-spectrometer 500, at least two of the hybrid filters 501-509 select for transmitting light components having different wavelength ranges. In sum, the spectral responses from the hybrid filters 501-509 may constitute the whole spectrum of the incident light. For example, the sum of the spectral responses from the hybrid filters 501-509 may cover the whole visible spectrum.

The hybrid filters 501-509 may be deposited on a substrate that includes at least photodetectors 571 and 572 and, optionally, photodetectors 573-579 disposed in the path of the light transmitted by each of the hybrid filters 501-509 (i.e., substantially under the hybrid filters 501-509, as was illustrated in FIG. 4B). Electric signals resulting from the detection of the filtered light by each of the photodetectors 571-579 may be extracted via electrical contacts not shown in FIG. 5.

Figure 6:
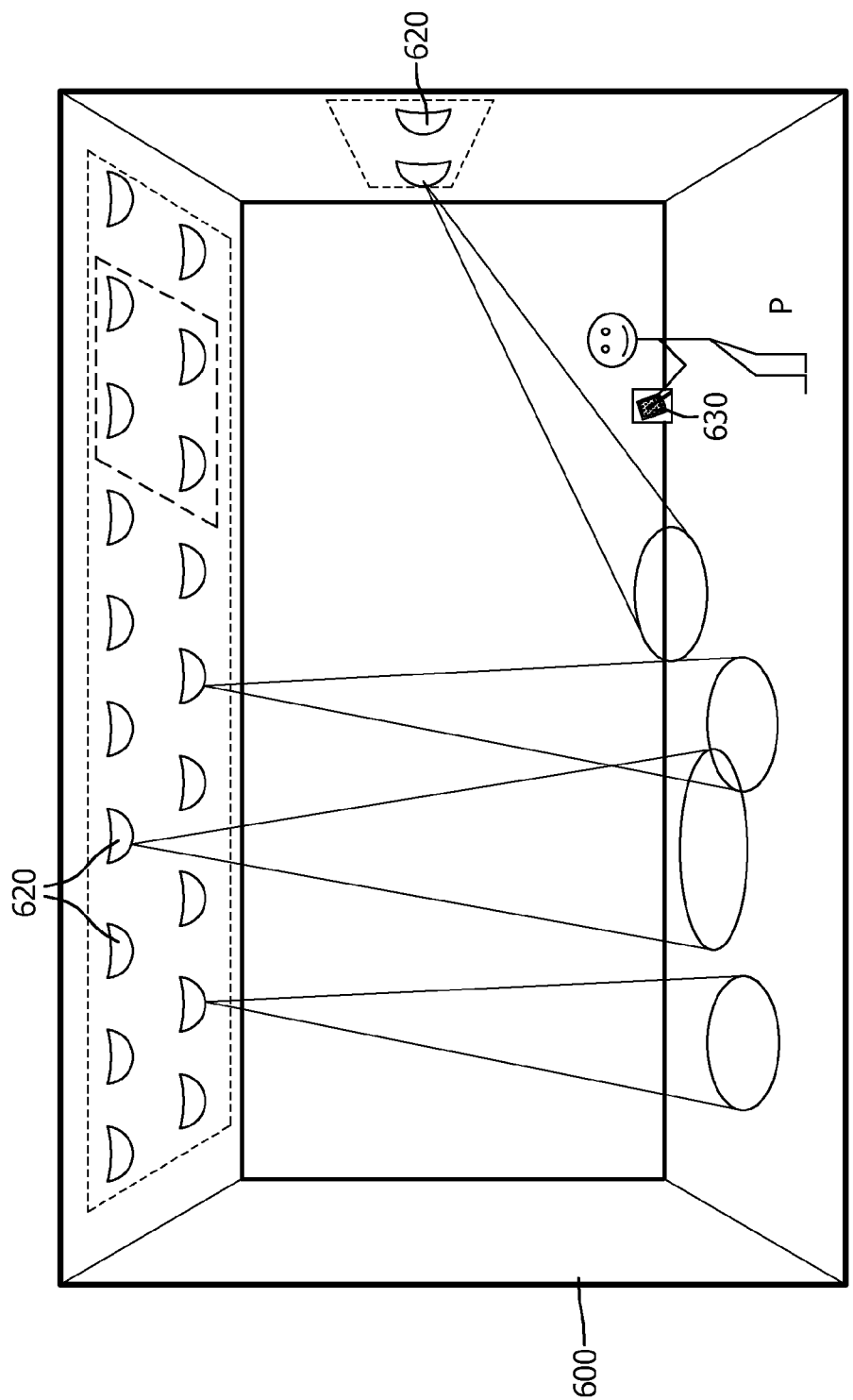
FIG. 6 shows an application of the mini-spectrometer according to one embodiment of the invention.

FIG. 6 illustrates an application of the mini-spectrometer 500 in a system 600 according to an embodiment of the invention. The system 600 is a wireless remote controlled device control system, i.e. a system wherein target devices are wirelessly controlled by means of a remote control device, in a structure comprising a remote control device 630 and lamps 620. Person P may, through the use of the remote control device 630 control the operation of the lamps 620. The control relates e.g. to controlling the color of the light emitted by the lamps 620. In order to realize proper control of the lamps 620, the mini-spectrometer 500 may be included within the remote control device 630. As described in FIG. 5, the mini-spectrometer 500 includes an array of narrow-band hybrid filters 501-509 coupled to photodetectors 571-579. Every photodetector 571-579 measures a small part of the spectrum transmitted via the corresponding one of the hybrid filters 501-509. With the individual results from the multiple photodetectors 571-579, a processing unit (not shown in FIG. 6) within the remote control device 630 may reconstruct the entire spectrum of light incident on the remote control device 630.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. An interference filter for receiving an incident light and selecting a light component of the incident light to be transmitted therethrough, comprising:
   a metal mirror;
   a dielectric mirror; and a spacer placed between the metal mirror and the dielectric mirror, wherein the metal mirror and the dielectric mirror are configured to enable optical interference in the spacer to select the light component of the incident light to be transmitted and to pass through the interference filter.

2. The interference filter according to claim 1, wherein at least one of a thickness and a composition of the spacer is defined to select the light component of the incident light to be transmitted.

3. The interference filter according to claim 1, wherein a thickness of the spacer is defined within a range of 60 nanometers (nm) to select the light component of the incident light to be transmitted having a central wavelength within a range of 140 nm, while a thickness of the metal mirror and a thickness of the dielectric mirror remain constant.

4. The interference filter according to claim 1, wherein the metal mirror is disposed on a substrate and is covered by the spacer on all sides except for the side facing the substrate.

5. The interference filter according to claim 1, wherein the metal mirror is disposed on a substrate and the interference filter further comprises a thin-film spacer layer disposed between the substrate and the metal mirror.

6. The interference filter of claim 1, wherein the dielectric mirror is configured to receive the incident light and the metal mirror is configured to output the selected light component of the incident light.

7. The interference filter of claim 1, wherein the spacer is substantially transparent for the incident light.

8. A minispectrometer for receiving an incident light and detecting one or more of light components of the incident light, comprising:
   a first interference filter configured for receiving the incident light and selecting a first light component of the incident light to be transmitted; and
   a first photodetector configured for detecting the first light component transmitted by the first interference filter;
   wherein the first interference filter comprises a first metal mirror, a first dielectric mirror, and a first spacer placed between the first metal mirror and the first dielectric mirror, and wherein the first metal mirror and the first dielectric mirror are configured to enable optical interference in the first spacer to select the first light component of the incident light to be transmitted.

9. The minispectrometer according to claim 8, wherein at least one of a thickness and a composition of the first spacer is defined to select the first light component of the incident light to be transmitted.

10. The minispectrometer according to claim 8, wherein a thickness of the first spacer is defined within a range of 60 nanometers (nm) to select the first light component of the incident light to be transmitted having a first central wavelength within a range of 140 nm, while a thickness of the first metal mirror and a thickness of the first dielectric mirror remain constant.

11. The minispectrometer according to claim 8, further comprising:
    a second interference filter configured for receiving the incident light and selecting a second light component of the incident light to be transmitted; and
    a second photodetector configured for detecting the second light component transmitted by the second interference filter;
    wherein the second interference filter comprises a second metal mirror, a second dielectric mirror, and a second spacer placed between the second metal mirror and the second dielectric mirror, and wherein the second metal mirror and the second dielectric mirror are configured to enable optical interference in the second spacer to select the second light component of the incident light to be transmitted, the second light component being different from the first light component in wavelengths to be transmitted.

12. The minispectrometer according to claim 11, wherein:
    the first spacer has a first thickness;
    the second spacer has a second thickness;
    the first metal mirror and the second metal mirror have a third thickness; and
    the first dielectric mirror and the second dielectric mirror have a fourth thickness.

13. The minispectrometer of claim 8, wherein the first dielectric mirror is configured to receive the incident light and the first metal mirror is configured to output the selected first light component of the incident light.

14. The minispectrometer of claim 8, wherein the metal mirror is disposed on a substrate and is covered by the spacer on all sides except for the side facing the substrate.

15. A method for fabricating at least a first interference filter for receiving an incident light and selecting a first light component of the incident light to be transmitted, the method comprising the steps of:
    providing a first metal mirror;
    providing a spacer over the first metal mirror; and
    providing a dielectric mirror over the spacer,
    wherein the first metal mirror, a part of the spacer provided substantially over the first metal mirror, and a part of the dielectric mirror provided substantially over the part of the spacer provided substantially over the first metal mirror form a first interference filter for receiving the incident light and selecting the first light component of the incident light to be transmitted.

16. The method according to claim 15, further comprising the step of providing a second metal mirror, wherein:
    the spacer is further provided over the second metal mirror so that a part of the spacer provided substantially over the first metal mirror has a first thickness and a part of the spacer provided substantially over the second metal mirror has a second thickness;
    the dielectric mirror is further provided over the spacer;
    the second metal mirror, a part of the spacer provided substantially over the second metal mirror, and a part of the dielectric mirror provided substantially over the part of the spacer provided substantially over the second metal mirror form a second interference filter for receiving the incident light and selecting a second light component of the incident light to be transmitted, the second light component being different from the first light component in wavelengths to be transmitted.

17. The method according to claim 16, wherein:
    the first metal mirror and the second metal mirror have a third thickness, and
    the part of the dielectric mirror forming the first interference filter and the part of the dielectric mirror forming the second interference filter have a fourth thickness.

18. The method according to claim 15, wherein:
    the first metal mirror is provided on a substrate comprising a first photodetector so that the first metal mirror is provided substantially over the first photodetector; and
    the first photodetector is configured for detecting the first light component.

19. The method according to claim 18, wherein the first metal mirror is completely covered by the spacer on all sides except for the side facing the substrate.

20. The method of claim 15, further comprising providing the first metal mirror on a substrate which includes a first photodetector configured for detecting the first light component transmitted by the first interference filter.

* * * * *